Patented Aug. 8, 1950

2,517,580

UNITED STATES PATENT OFFICE 2,517,580

Arthur J. Lewis, Peoria, Ill., assignor to the United States of America as represented by the Secretary of Agriculture No Drawing. Application October 28, 1949, Serial No. 124,253

3 Claims. (Cl. 106—15)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to improved coating compositions, in particular, improved red iron oxide pigment paints as commonly used on barns and other farm buildings.

This invention has among its objects the provision of a red iron oxide paint that has improved mildew resistance, improved drying properties, good color retention and improved durability, containing soybean oil as the principal oil vehicle.

Red iron oxide paints of the general type described herein are generally applied on barns and other farm buildings under conditions conducive to the culture and growth of certain microorganisms on paint coatings. If the paint is slow-drying, conditions for the microorganism growth are enhanced, since it appears to occur on the vegetable oil vehicle of the paint.

These organisms are generally known as mildew, and their colonies of spores are usually black or dark brown. The mildew spots are unsightly, and vigorous washing with alkali soaps is required to remove them prior to repainting.

Hard drying varnishes or fungus poisons are known to reduce the tendency of these paints to mildew. However, the former are expensive and tend to cause the coating to crack, whereas the latter are a source of danger to farm animals.

Prior to my invention soybean oil paints have found little use as the oil vehicle in red iron oxide paints due to the disadvantages attending their general slow-drying properties, particularly the tendency of the coatings to mildew.

As described in copending applications Serial No. 674,159, filed June 4, 1946, now U. S. Patent No. 2,494,565, issued Jan. 17, 1950, and Serial No. 35,276, filed June 25, 1948, respectively, by Lewis, Cowan and Moser, soybean oil paints characteristically exhibit aftertack, as well as residual tack, resulting in decreased durability and undesirable dirt retention. Such paints are, moreover, subject to poor color retention and chalking.

I have discovered that red iron oxide pigment paints, commonly known as red barn paints, may be improved greatly by the addition of calcium oxide, in a manner similar to the improvements described in Serial No. 35,276, previously referred to, namely, faster drying properties, improved color retention, decreased dirt retention and increased durability. Furthermore, and of considerable importance in this particular type of paint, I have discovered that the addition of the calcium oxide greatly increases the mildew resistance of the coatings.

In my researches I have found that certain additives, such as zinc oxide, inhibit mildew resistance to some extent in such paints, but only calcium oxide appears to possess also all the characteristics of improved drying rate, color retention, durability and decreased dirt retention, which characteristics make for a practical coating.

The iron oxide pigments within the purview of this invention may be such pigments as Venetian red, Indian red, metallic red, and the like. My paints are compatible with the commonly used red barn paint ingredients, such as oil driers, varnishes, and minor proportions of other pigments, such as zinc oxide, asbestine, calcium carbonate, lithopone and the like.

The soybean oil vehicles which may be used according to my invention include conjugated oils, alkali refined oils, mechanically refined oils, low acid number bodied oils and the like.

The calcium oxide used in my compositions should be essentially all calcium oxide. Minor amounts of calcium hydroxide, such as may be present after exposure to air in handling, are not detrimental, however.

The amount of calcium oxide ranges from 3 to 7 percent of the total weight of the paint. Since the usual formula requires pigment and oil vehicle in the proportion of about two to one, this range normally corresponds to from 4 to 10 percent of the total weight of the pigment. Greater amounts of calcium oxide tend to cause undue cracking and checking of the coatings.

The following specific examples illustrate the invention. Parts are by weight unless otherwise specified.

Three paint compositions were made up in accordance with the following formulae:

*Paint No. 1*

| | Parts |
|---|---|
| Red iron oxide pigment | 67 |
| Alkali refined soybean oil | 31½ |
| Oil drier | 1½ |

*Paint No. 2*

| | Parts |
|---|---|
| Red iron oxide pigment | 63 |
| Calcium oxide | 4 |
| Alkali refined soybean oil | 31½ |
| Oil drier | 1½ |

Paint No. 3

| | Parts |
|---|---|
| Red iron oxide pigment | 63 |
| Zinc oxide | 4 |
| Alkali refined soybean oil | 31½ |
| Oil drier | 1½ |

The above paints were tested comparatively for drying qualities and weathering qualities. Paint No. 1 represents a usual red barn paint formula of iron oxide, oil and drier, in which the customary linseed oil type vehicle has been replaced by the soybean oil. The drying tests were carried out on a Sanderson drying meter in a room held at a constant temperature of approximately 78° F. and at a humidity of 50±3 percent.

The weathering tests were carried out by brushing three coats from each paint on red cedar panels and exposing the panels on outdoor test fences at Peoria, Illinois. The panels were placed vertically facing south so as to bring about maximum exposure effect. The exposure was designed to accelerate weathering at a rate at least double that normally encountered for outdoor coatings. Moreover, the conditions were particularly adaptable to mildewing since the exposure site was marshy during the winter months and was generally conducive to dampness and moisture.

The results of the drying tests were as follows. The coating from Paint No. 1 was still very tacky after 80 hours. Paint No. 2 dried to a tack free film in 10 hours. Paint No. 3 dried to a tack free film in 24 hours.

The results of the weathering tests are discussed under the following separate headings. The exposure time was seven months.

Mildew resistance

Coatings from Paint No. 1 were badly discolored by mildew. Spores were removed and organisms were identified as *Pullularia pullulans*. Coatings from Paints No. 2 and 3 were not mildewed.

Durability

Paint No. 1 showed a moderate amount of surface checking. The coatings from Paint No. 2 remained in excellent condition after 7 months. Coatings from Paint No. 3 checked badly in a deep alligator pattern.

Dirt retention

Coatings from Paint No. 1 collected and retained a considerable amount of dirt which could not be removed by washing with water and a sponge. The coatings from Paints No. 2 and No. 3 were clean and free from collected and/or retained dirt.

Color retention

The coatings from Paint No. 1 darkened considerably, and those from Paint No. 3 lightened considerably. Coatings from Paint No. 2 retained the original color.

At the end of sixteen months the coating from Paint No. 2 showed outstanding characteristics of mildew resistance, durability, decreased dirt retention (practically no dirt retention) and color retention. In contrast, the coating from Paint No. 1 increased in midew discoloration and showed incipient checking and cracking. The coating from Paint No. 3 showed increased cracking and had developed a tendency to scale.

I claim:

1. A paint composition comprising soybean oil as the principal oil vehicle, calcium oxide, a pigment consisting essentially of red iron oxide, and a drier, the calcium oxide being present in an amount within the range of 3 to 7 percent of the total weight of the paint.

2. A paint composition comprising soybean oil as the principal oil vehicle, calcium oxide, a pigment consisting essentially of red iron oxide, and a drier, the calcium oxide being present in an amount of 4 percent of the total weight of the paint.

3. Composition of claim 1 in which the principal oil vehicle is alkali refined soybean oil.

ARTHUR J. LEWIS.

No references cited.